(12) United States Patent
Erhardt et al.

(10) Patent No.: US 9,032,833 B2
(45) Date of Patent: May 19, 2015

(54) SECURING ELEMENT, STEERING BEARING WITH A SECURING ELEMENT AND STEERING COLUMN WITH A STEERING BEARING AND A SECURING ELEMENT

(75) Inventors: Herbert Erhardt, Herzogenaurach (DE); Richard Baier, Aurachtal (DE); Jochen Ott, Roettenbach (DE); Rainer Lutz, Markt Erlbach (DE); Anton Erhardt, Herzogenaurach (DE); Peter Loncar, Herzogenaurach (DE); Reinhold Nuetzel, Adelsorf (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 14/236,467

(22) PCT Filed: Aug. 1, 2011

(86) PCT No.: PCT/EP2011/063176
§ 371 (c)(1),
(2), (4) Date: Apr. 8, 2014

(87) PCT Pub. No.: WO2013/017157
PCT Pub. Date: Feb. 7, 2013

(65) Prior Publication Data
US 2014/0345414 A1 Nov. 27, 2014

(51) Int. Cl.
*F16C 19/06* (2006.01)
*F16C 35/063* (2006.01)
*B62D 1/16* (2006.01)
(Continued)

(52) U.S. Cl.
CPC .............. *F16C 35/0635* (2013.01); *B62D 1/16* (2013.01); *F16B 21/20* (2013.01); *F16C 33/588* (2013.01); *F16C 19/06* (2013.01); *F16C 2226/16* (2013.01); *F16C 2326/24* (2013.01)

(58) Field of Classification Search
USPC ......... 384/490, 510, 513, 515, 537–539, 609, 384/611, 615, 617
IPC ....................................................... F16C 19/06
See application file for complete search history.

(56) References Cited

U.S. PATENT DOCUMENTS

| 4,480,490 | A | 11/1984 | Inoue |
| 4,573,713 | A | 3/1986 | Kipp et al. |
| 6,287,013 | B1 * | 9/2001 | Loncar et al. ................. 384/539 |

(Continued)

FOREIGN PATENT DOCUMENTS

| DE | 33 05 419 A | 8/1984 |
| DE | 10 2006 060883 | 6/2008 |

(Continued)

*Primary Examiner* — Faye M Fleming
(74) *Attorney, Agent, or Firm* — Davidson, Davidson & Kappel, LLC

(57) ABSTRACT

A securing element (1) with an annular body (3, 12a, 26) and with holding tongues (4) which emerge from the annular body (3, 12a, 26) and end at a hole (6) in the securing element (1), which hole is centered with respect to the center axis (5) of the securing element (1), wherein the hole (6) leads axially in the same direction as the center axis (5) through the securing element (1) and, at the radial narrowest points of the hole (6), is bounded at least by end edges (7) formed on the end sides of the holding tongues (4), and wherein in each case at least two surfaces (8, 9) bounding part of the holding tongue (4) meet and end at the respective end edge (7), and of which one of the surfaces (8) is formed on the front side of the holding tongue (4).

10 Claims, 7 Drawing Sheets

(51) Int. Cl.
*F16B 21/20* (2006.01)
*F16C 33/58* (2006.01)

(56) References Cited

U.S. PATENT DOCUMENTS 6,375,360 B1 * 4/2002 Weisskopf et al. ........... 384/538
6,416,229 B1 * 7/2002 Wolf .............................. 384/516

FOREIGN PATENT DOCUMENTS

| DE | 10 2009 051 107 B3 | 4/2011 |
| EP | 0 078 163 | 5/1983 |
| EP | 2 249 050 A1 | 11/2010 |
| JP | 54 083 026 | 6/1979 |
| WO | WO2008077367 | 7/2008 |

* cited by examiner

SECURING ELEMENT, STEERING BEARING WITH A SECURING ELEMENT AND STEERING COLUMN WITH A STEERING BEARING AND A SECURING ELEMENT

The invention concerns a securing element comprising an annular body and retaining tongues which start from the annular body and end at a hole in the securing element, which hole is centered relative to the central axis of the securing element and extends axially through the securing element in the same direction as the central axis while being defined at narrowest radial hole cross-sections of the hole at least through front edges configured on end sides of the retaining tongues, and wherein in each case at least two surfaces defining a part of the retaining tongue converge into each other at the respective front edge and end on this front edge, one of the surfaces being configured on a front end side of the retaining tongue. The invention further concerns a steering bearing comprising such a securing element and a steering bearing, as also a steering bearing comprising at least one of the securing elements.

BACKGROUND

Securing elements of the aforesaid type are supported through the retaining tongues by positive engagement and force-locking on the surface of a shaft. The securing elements also designated as indented rings in DE 33 05 419 A1 are resilient and hardened. The radial dimensions of the clear cross-section of a hole between the retaining tongues (teeth) situated opposite each other at the central axis of the indented ring are smaller than the outer radial dimensions of the shaft measured in the same direction on the seat of the indented ring. When the indented ring is pushed onto the shaft, the teeth deflect elastically and yield outwards so that the free cross-section of the hole is enlarged to the outer radial dimensions of the shaft and the shaft can be pushed into the hole.

The front edges of the retaining tongues dig themselves slightly into the surface of the shaft at the desired position of the indented ring under the resilient pre-stress exerted by the retaining tongues. For this purpose, the shaft must have a soft surface. The front edges cut themselves into the material on the surface of the shaft. The seat of an indented ring is therefore formed as a rule by positive engagement and force-locking. When the indented ring is loaded in a direction opposite the original insertion direction of the shaft, the indented ring is supported through the retaining tongues on the shaft and digs itself into this. Such securing elements are therefore designated as self-locking securing elements.

Advantageously, securing elements of this type can be fixed on shafts at any desired points irrespective of the tolerances. In addition, these securing elements can be manufactured economically as mass articles and are preferably used, for example, in the upper part of steering columns for assuring the shaft seating of steering bearings on the steering shaft.

A steering column of the generic type is described in EP 2 249 050 A1. The steering bearings are angular contact ball bearings. The inner rings of two angular contact ball bearings positioned against each other and pre-stressed against each other are centered, each one, by a respective clamping ring on the shaft. A wavy spring or another spring is elastically biased in axial direction against each of the clamping rings. The spring, the clamping ring and thus also the respective inner ring is fixed in place through an indented ring.

A steering bearing of the generic type for a rotatable mounting of a shaft configured as a steering spindle in a steering column tube is described in DE 10 2009 051 107 B3. The inner ring of the angular contact ball bearing is configured integrally with the generic securing element. Advantageously, one component less must be mounted during assembly of the steering column. The work and expenditure for the assembly, the feeding, the storage and transportation can be kept at a low level. In addition, manufacturing costs of such steering columns are also reduced.

Steering columns are sub-assemblies of which high demands are made with respect to safety of operation and behavior during a crash. For example, a dagger-like penetration of the steering spindle into the driver's cab during a crash must be absolutely excluded. The requirements made of the axial retaining ability of the generic securing elements are therefore very high.

Indented rings and inner rings of steering bearings with integrated securing elements are punched out of sheet metal and cold shaped. The front edges are the result of the initial punching of the mostly rotationally symmetric rings. Not least of all, the retaining ability of the securing elements depends on the configuration of the front edges.

Edges are usually formed by two converging surfaces. One of these surfaces that end at the front edge is accordingly the front end surface of the retaining tongues that extends crosswise to both the front surfaces of the retaining tongues and is directed towards the central axis. This front end surface is created during the manufacture of the securing element by punching and defines a part of the hole in the securing element in radial direction. The other surface is a planar section on a front side of the securing element of the respective retaining tongue and is directed in direction of the shaft during the mounting of the indented ring in feeding direction.

SUMMARY OF THE INVENTION

It is an object of the present invention to provide securing elements as well as steering bearings preferably for use in steering columns, whose shaft seats are reliably retained and which can be manufactured in a simple and economical manner.

The present invention provides a securing element comprising an annular body and retaining tongues which start from the annular body and end at a hole in the securing element, which hole is centered relative to a central axis of the securing element and extends axially through the securing element in the same direction as the central axis while being defined at narrowest radial hole cross-sections of the hole at least through front edges configured on end sides of the retaining tongues, and wherein in each case at least two surfaces defining a part of the retaining tongue converge into each other at the respective front edge and end on this front edge, one of the surfaces being configured on a front end side of the retaining tongue, characterized in that the surfaces are inclined towards each other with at least an acute angle at least on one of the retaining tongues at least at a location where the surfaces merge into the front edge.

According to the invention, the two surfaces generating the front edge are inclined relative to each other at least at an acute angle on at least on one of the retaining tongues, preferably on all the retaining tongues. The angle included by the surfaces starting from the front edge is situated in a range of $15° \leq \alpha \leq 60°$.

FIG. 7 shows a semi-section taken along the central axis of a securing element 100 of the prior art in form of an indented ring 101, in a not-to-scale illustration. The indented ring 101 comprises an annular body 102 from which retaining tongues 104 project in direction of the central axis 103. The annular body 102 has a substantially hollow cylindrical configuration and, optionally, it can also be configured in form of a disk or in a shape mixture out of these two configurations. The retaining tongue 104 in the upper part of the figure is shown in a sectional view. The retaining tongues 104 are stamped out by bending out of the material of the securing element 100 so as to be inclined at an angle β to a radial plane E. The radial plane E is crossed perpendicularly by the central axis 103. For mounting the indented ring 101 on a shaft, in the case of this figure, the shaft is pushed from the left to the right through the indented ring 101, or the indented ring 101 is pushed from the right to the left on to the shaft.

Each of the retaining tongues 104 comprises two front edges 105 and 105a that define the front end surface 107 of the retaining tongues 104 in axial direction. Due to the inclination of the respective retaining tongue 104 to the radial plane E, the front edge 105 protrudes radially furthest in direction of the central axis 103 out of end 108 of the retaining tongue 104. Two surfaces 106 and 107 converge into each other at the front edge 105 and end on this front edge 105. The respective surface 106 is configured on a front side of the retaining tongue 104 and starts from the annular body to extend up to the end 108 of the securing element 100 and thus up to the end 108 of the retaining tongue 104. The other surface 107 is a front end surface on a front end of the respective retaining tongue 104. The surfaces 106 and 107 are inclined at an angle of 90° to each other. As far as possible, the front edge 105 should be uninterrupted. During the process of manufacture and handling of the soft part of the securing element prior to hardening, an uninterrupted contour of the front edge cannot be assured in every case, so that this can have a detrimental effect on the retaining ability of the securing element on the shaft.

In deviation from the prior art, the securing element described with the invention comprises two surfaces, the front side surface and the front end surface, that, starting from the front edge, are inclined bezel-like at an acute angle to each other. For a large part of securing elements this alone assures an improved retaining ability on shafts because a sharp edge penetrates very effectively into the surface of the shaft. The shaft should preferably be made of unhardened steel and the securing element should be hardened as far as possible at least on the front edge configured as a bezel. With a view to the resistivity, the resilient behavior and for cost reasons, it is advantageous if the entire securing element or an inner ring configured integrally with the securing element is hardened. By edge or front edge are to be understood also those edges that are interrupted by radii, other curve-type rounded portions or bevels. The preferred edge radii are ≤0.4 mm, preferably 0.2 mm. This also applies to bevels.

There are also securing elements in which the retaining tongues, at the stage in which the securing element is ready-manufactured but not yet mounted on a shaft, end with a radial plane, that is to say they are not stamped out axially in the initial state. The retaining tongues of such securing elements are pressed out of the radial plane and brought into an inclined position only when the shaft is inserted into the hole which is slightly too small for the outer diameter of the shaft. The retaining tongues must deflect resiliently in the same direction as the direction of insertion of the shaft till the hole has become large enough for the diameter of the shaft. The invention also applies to such securing elements. But preferably, the invention applies to those securing elements in which the retaining tongues are stamped out inclined at an acute angle to the radial plane already during manufacturing. It is not of importance whether the retaining tongues are inclined at an angle to the radial plane or extend in an arc-shape relative to the radial plane or are discontinuously inclined.

According to one feature of the invention, the bezel-like configured front edge protrudes beyond the level of one of the surfaces or beyond the level of both surfaces that converge into each other on the front edge. Shortly before the front edge, the surface section ascends with a curved or linear shape out of the respective surface to extend beyond the level thereof up to the front edge. The advantage of this is that, in spite of the possible undesired edge interruptions on the soft part due to the edge protruding out of the surfaces, a comparatively sharp residual material can always remain in existence.

The front or cutting edges of the retaining tongues extend in a straight line or, for instance, tangentially directed. Alternatively they extend in a curve on a circumferential line whose curvature corresponds to the curvature of the surface of the shaft on which the securing element is to be seated later.

According to one feature of the invention, the front edge of the respective tongue is interrupted by at least one depression that extends at least into one of the surfaces. Such configurations can have a favorable influence on a still further improved retaining ability because, in this way, the front edge can claw itself into the surface of the shaft and osculate with this still better. Moreover, a cutting edge with an indented configuration caused by interruptions can penetrate better into the surface of the shaft.

The retaining tongues of the securing elements are made preferably in one piece and out of one material with the annular body. In peripheral direction, for forming the retaining tongues, the annular body is incised for forming radial slits through which the retaining tongues are separated from peripherally adjacent retaining tongues while being resiliently movable relative to one another. The circumferentially closed annular body or the annular body comprising one slit retains the retaining tongues peripherally in place because these are configured in one piece the annular body. The slits can be so small that the retaining tongues are in contact with each other at the slits. In one preferred embodiment of the invention, in contrast, the central hole of the securing element is defined by an inner edge comprising recesses and adjoining the front edges. The retaining tongues are separated in peripheral direction from one another by the recesses that end on the annular body and are open towards the hole. The circumferentially closed annular body or, alternatively, the annular body comprising one slit, holds the retaining tongues together. Through the rounding of the recesses, notch stresses in the securing element and cracks resulting therefrom can be avoided. Besides this, through the choice of suitable dimensions for the recesses, the resilient behavior of the retaining tongues can be variably designed.

The invention provides a steering bearing comprising a securing element according to the invention. The steering bearing comprises at least the inner ring and rolling elements, an outer raceway possibly on an outer ring or directly in a steering column tube, and a cage. The securing element is integrated into the steering bearing, optionally as a separate component in a self-retaining unit, that is formed for example out of an outer ring, balls, an inner ring, a spring ring and an indented ring. Alternatively the securing element is configured in one piece and in one material with the inner ring of the steering bearing.

The invention further provides a steering column comprising at least one steering tube and a steering spindle rotatably mounted with help of steering bearings in the steering tube. In this steering column, the inner ring of the steering bearing is fixed with help of at least one securing element through positive engagement and by force-locking on the steering spindle, the securing element being configured as a separate component or being integrated in the inner ring. The inner ring is supported axially on the steering spindle, in a rigid or an elastic manner, with or without interposition of at least one spring element, on the securing element that is fixed on the steering spindle.

By the term "shafts" are to be understood all components and machine elements that are rotatable or rigid and are suitable and provided for receiving and fixing different components.

BRIEF DESCRIPTION OF THE DRAWINGS

The invention will be described more closely in the following with reference to the appended drawings.

DETAILED DESCRIPTION

Figure 1:
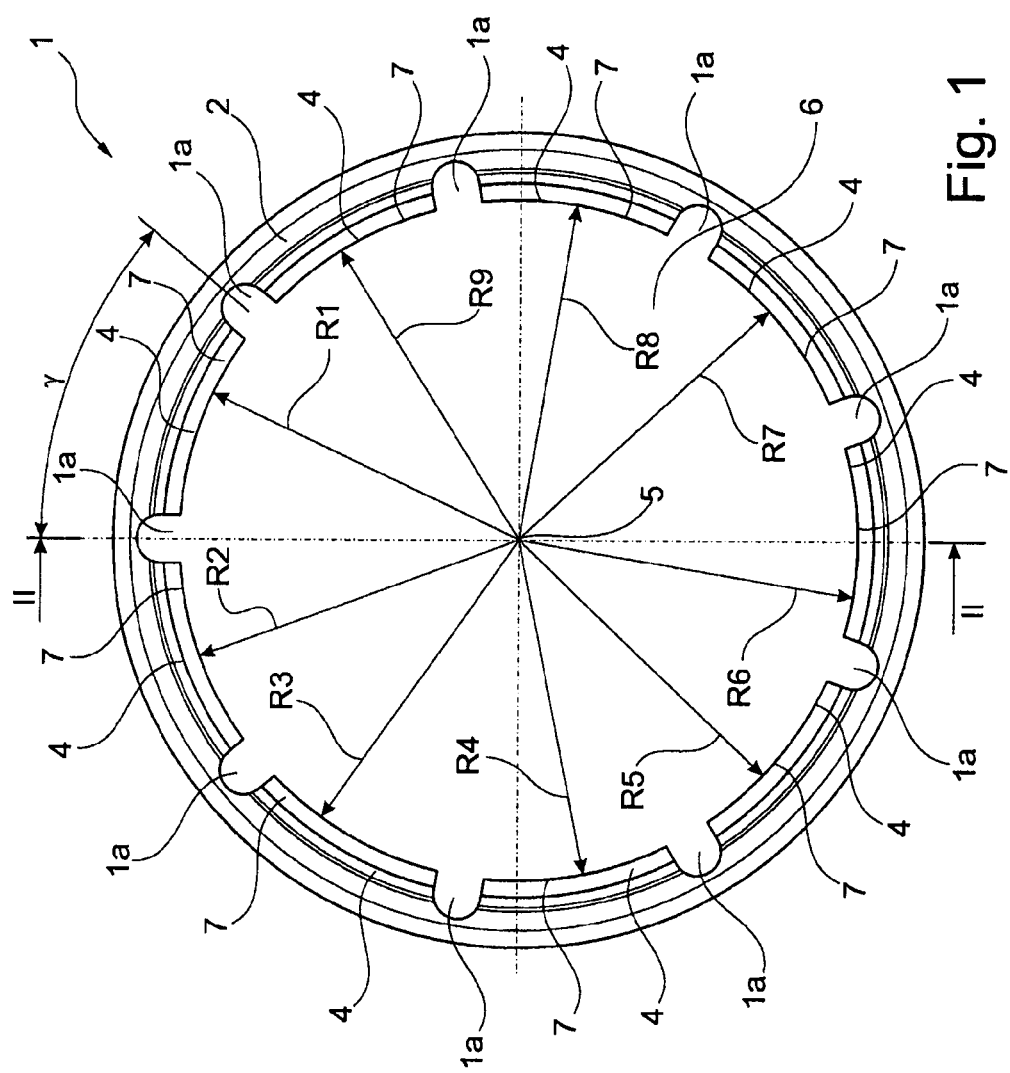
FIG. 1 shows a face view of a securing element 1 that is configured as an indented ring 2.
Figure 2:
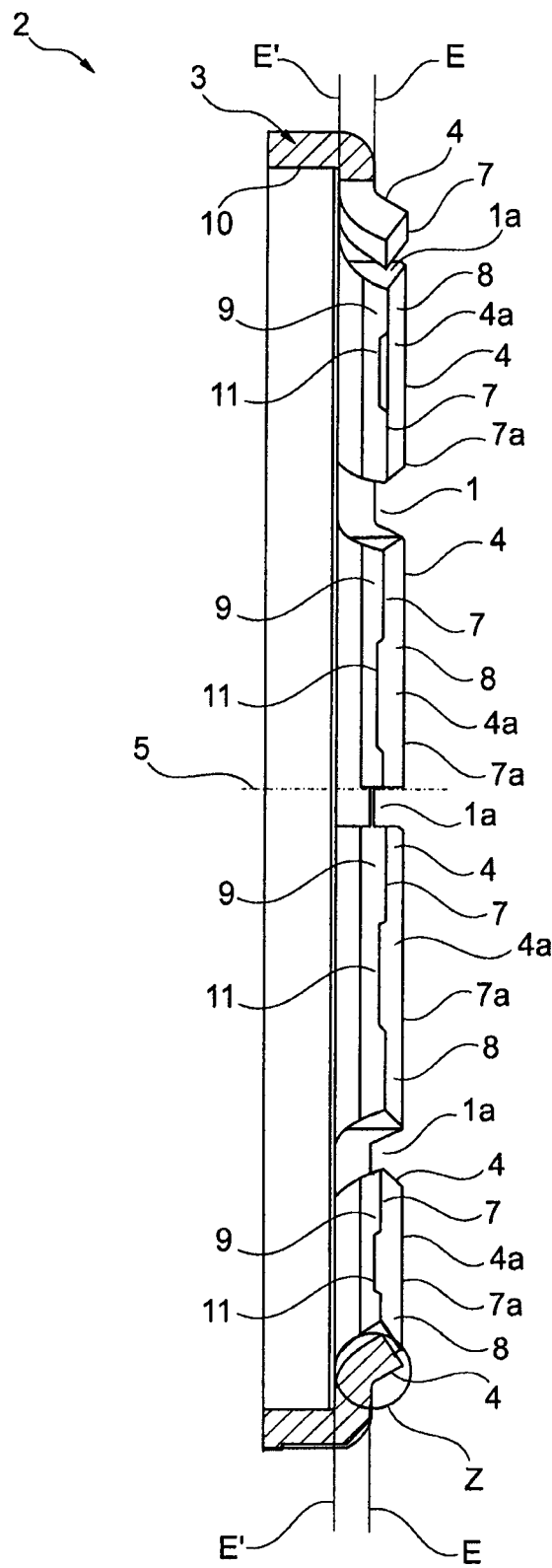
FIG. 2 shows a sectional representation of the securing element 1 taken along the line II-11 of FIG. 1 and along the central axis 5.
Figure 3:
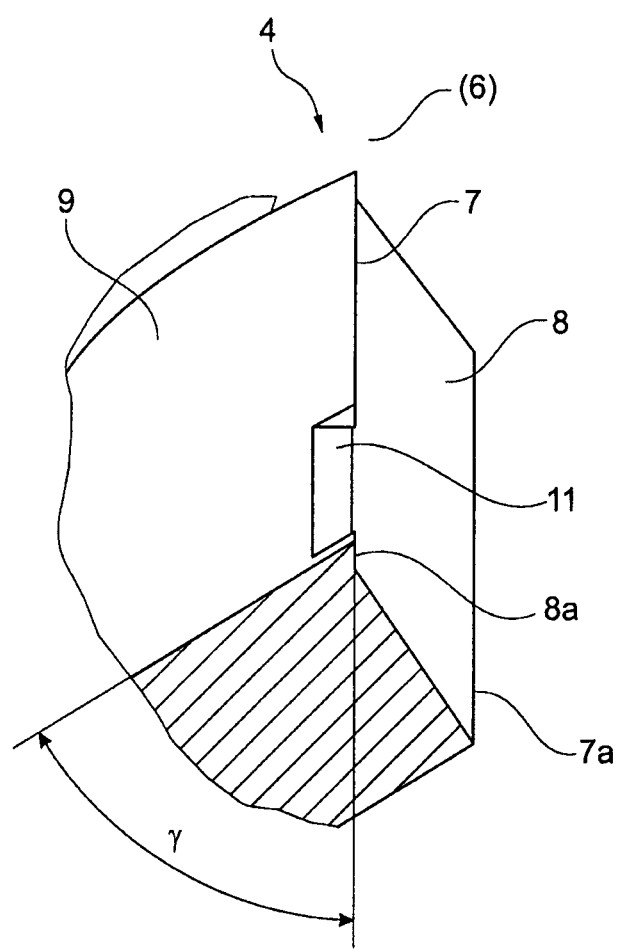
FIG. 3 shows a not-to-scale, enlarged illustration of the detail Z of FIG. 2.

FIGS. 1, 2 and 3: FIG. 1 shows a face view of a securing element 1 that is configured as an indented ring 2. FIG. 2 shows a sectional representation of the securing element 1 taken along the line II-11 of FIG. 1 and along the central axis 5. FIG. 3 shows a not-to-scale, enlarged illustration of the detail Z of FIG. 2.

The securing element 1 comprises an annular body 3 comprising retaining tongues 4 that end in the securing element 1 at a hole 6 that is centered relative to the central axis 5 of the securing element 1. The hole 6 extends axially in the same direction as the central axis 5 through the securing element 1. The radially narrowest points of the hole 6 are described through the inner radii R1 to R9 and are defined at end sides of the retaining tongues 4 by front edges 7. Further, the hole 6 is defined by an inner edge comprising recesses 1a and adjoining the front edges 7. The recesses 1a start from the annular body 3 and are open towards the hole 6, so that the retaining tongues 4 are separated from one another in peripheral direction and are uniformly spaced from one another along the periphery at an angular pitch of γ.

At each front edge 7, at least two respective surfaces 8 and 9 that define a part of the surface of the respective retaining tongue 4 converge into each other. The surface 8 is configured on a front end side of each retaining tongue 4 and defined by the front edges 7 and 7a. The other surface 9 covers the front side of the securing element 1 and is a planar section that continues in an inner cylindrical surface 10 of the annular body 3. The retaining tongues 4 are stamped axially out of the parallel radial planes E and E' and are inclined relative to the respective radial planes E and E' which are crossed perpendicularly by the central axis 5.

FIG. 3: The surfaces 8 and 9 start from the front edge 7 and are inclined at an acute angle α towards each other. As a result, the front edge 7 protrudes radially further out of the end 4a of the respective retaining tongue 4 in direction of the central axis 5 than the front edge 7a so that it is only the front edge 7 that comes into contact with the surface of the shaft when this is inserted into the hole 6. Moreover, the front edge 7 protrudes in radial direction beyond the surface 8 (front end surface) because the surface 8 comprises in the direction of the front edge 7 a flat, planar section 8a that follows a course that ascends from the surface 8 in direction of the front edge 7 beyond the level of the surface 8 up to the front edge 7 so that the front edge 7 protrudes beyond the actual level of a front edge and of the front end side surface 8 into the hole 6.

FIGS. 2 and 3: The front edge 7 on each retaining tongue 4 is interrupted by a depression 11 that extends partially into both the surfaces 8 and 9.

Figure 4:
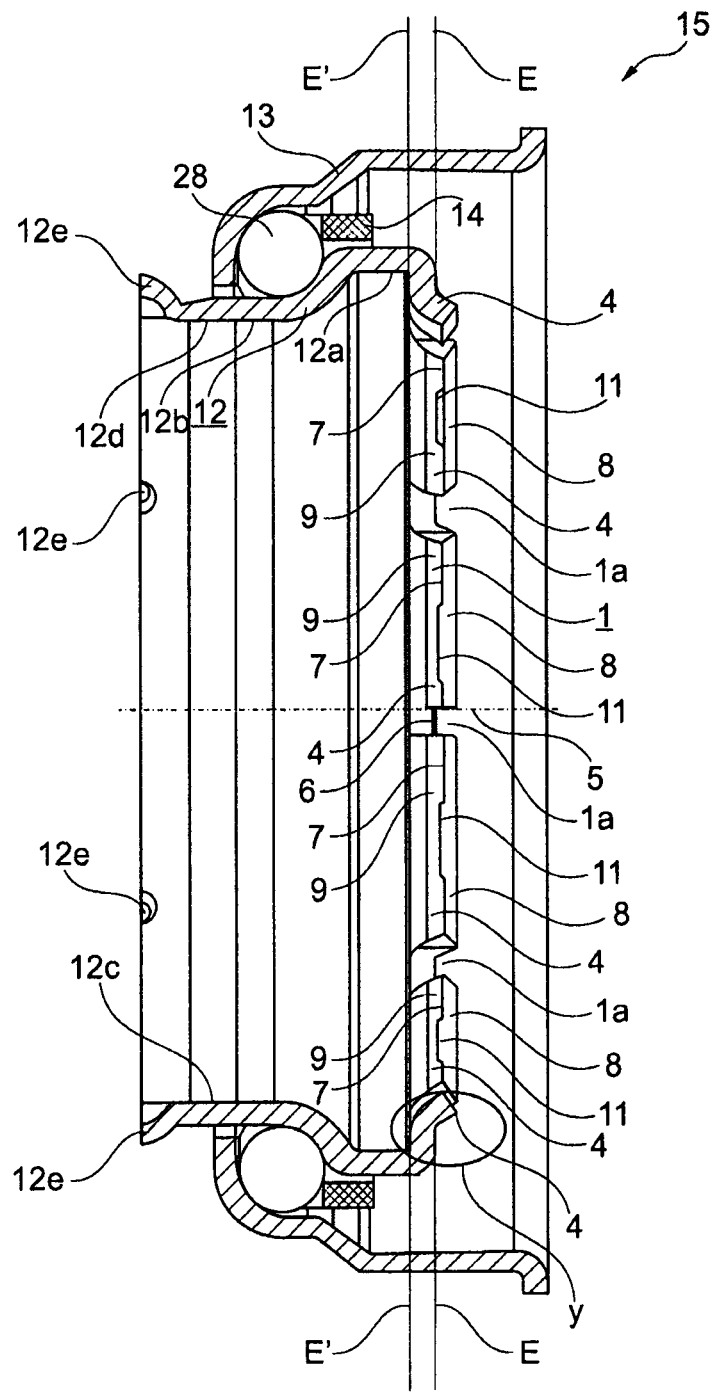
FIG. 4 shows a steering bearing 15 that is made up of an inner ring 12, an outer ring 13 and rolling elements 28 that are guided in a cage 14.

FIG. 4: FIG. 4 shows a steering bearing 15 that is made up of an inner ring 12, an outer ring 13 and rolling elements 28 that are guided in a cage 14. The securing element 1 is configured in one piece with the inner ring 12. The annular body 12a of the securing element 1 is configured in one piece with a raceway section 12b of the inner ring 12. The rolling elements 28 run on the raceway section 12b. The raceway section 12b is followed by a shaft seat section 12c that is configured in one piece with the inner ring 12 and is adjoined by a lengthening section 12d of the inner ring 12. Retaining lugs 12e are formed in radially outward direction on the lengthening section 12d, through which retaining lugs 12e the individual parts, outer ring 13, cage 14 with rolling elements 28 and the inner ring 12 with the securing element 1, are retained in form of a self-retaining unit.

FIGS. 1, 3 and 4: The securing element 1 comprises the annular body 12a but, for the rest, also corresponds to the structure shown in FIGS. 1 and 3, FIG. 3 showing in this case the detail Y of FIG. 4. The annular body 12a is provided with retaining tongues 4 which end in the securing element 1 at a hole 6 that is centered about the central axis 5 of the securing element 1. The hole 6 extends axially in the same direction as the central axis 5 through the securing element 1. The course of the front edges 7 is described at radially narrowest points of the hole 6 by the inner radii R1 to R9. The hole 6 is further defined by an inner edge comprising recesses 1a and adjoining the front edges 7. The recesses 1a start from the annular body 3 and are open towards the hole 6 so that the retaining tongues 4 are separated from one another in peripheral direction and are uniformly spaced from one another along the periphery at an angular pitch of γ.

At each front edge 7, at least two respective surfaces 8 and 9 that define a part of the surface of each retaining tongue 4 converge into each other. The surface 8 is configured on a front side of each retaining tongue 4 and ends on the front edges 7 and 7a. The other surface 9 covers the front end of the securing element 1 and is a planar section that continues in an inner cylindrical surface 10 of the annular body 3. The retaining tongues 4 are stamped out of the parallel radial planes E and E' and are inclined with respect to these radial planes E and E'.

The surfaces 8 and 9 start from the front edge 7 and are inclined at an acute angel a towards each other. The front edge 7 protrudes in radial direction beyond the actual level of the surface 8 (front end surface). The planar section 8a follows a course that ascends from the surface 8 towards the front edge 7 beyond the level of the surface 8 up to the front edge 7 so that the front edge 7 protrudes beyond the front side surface 8 into the hole 6.

FIGS. 3 and 4: The respective front edge 7 of each retaining tongue 4 is interrupted by a depression that extends partially into both the surfaces 8 and 9.

Figure 5:
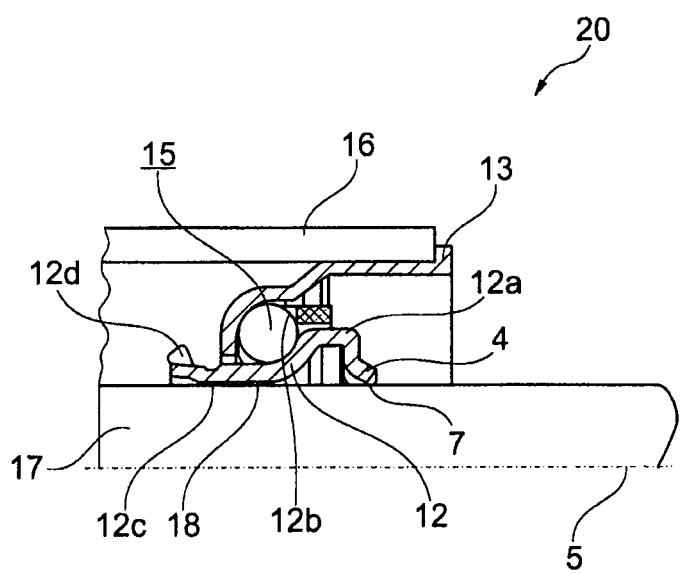
FIG. 5 shows a part of a steering column 20 in a longitudinal section along a central axis 5 of a steering spindle 17.

FIG. 5 shows a part of a steering column 20 in a longitudinal section along a central axis 5 of a steering spindle 17. The steering column 20 comprises the steering bearing 15, a steering tube 16 and the steering spindle 17. The steering spindle 17 is mounted rotatably in the steering tube 16 with help of the steering bearing 15. For this purpose, the outer ring 13 is fixedly seated in the steering tube 16 and the inner ring 12 is fixedly seated on the steering spindle 17. The inner ring 12 is supported through the shaft seat section 12c on the shaft seat 18 of the steering spindle 17, possibly with a press fit. The lengthening section 12d has no contact with the steering spindle 17. Further, with help of the securing element 1, the inner ring 12 is axially secured on the steering spindle 17 against axial thrust loads. For this purpose, the retaining tongues 4 are resiliently biased against the surface 19 of the steering spindle 17 and are clawed with the front edges 7 into the surface 19.

Figure 6:
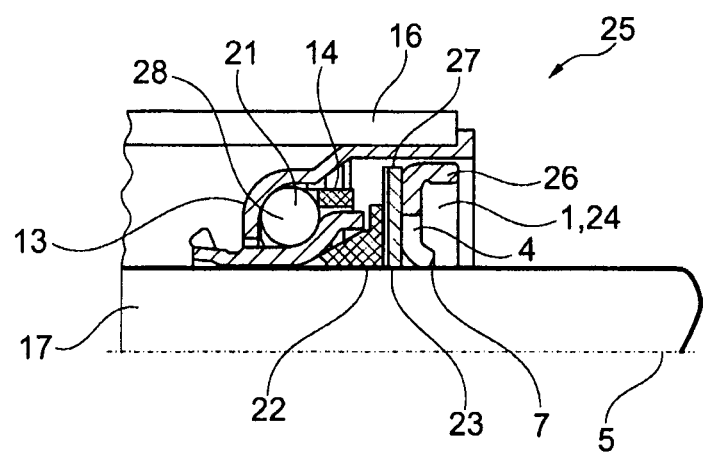
FIG. 6 shows a part of a steering column 25 in a longitudinal section along its central axis 5.
Figure 7:
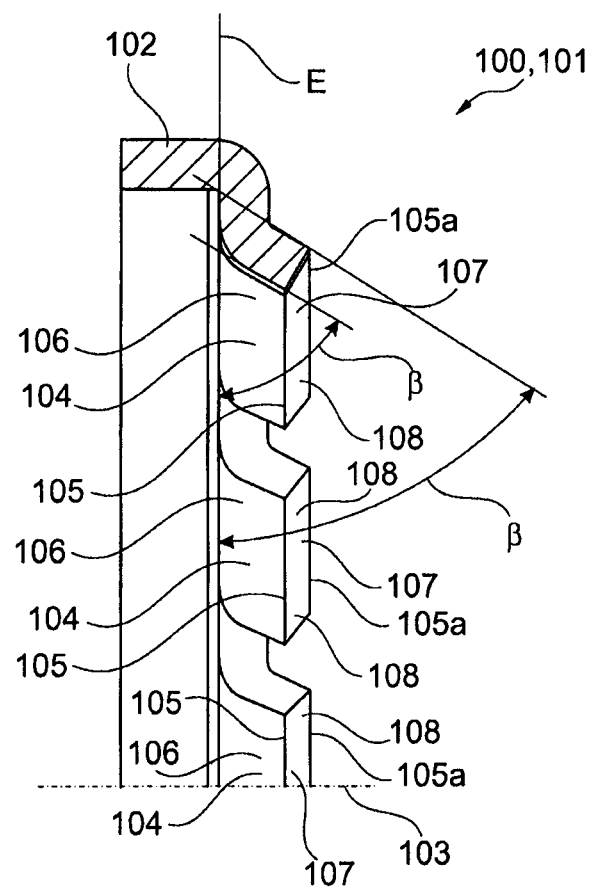
FIG. 7 shows a semi-section taken along the central axis of a securing element 100 of the prior art in form of an indented ring 101, in a not-to-scale illustration.

FIG. 6 shows a part of a steering column 25 in a longitudinal section along its central axis 5. The steering column 25 comprises a steering bearing 21 in the steering tube 16, a clamping ring 22, a wavy spring 23 and a securing element 1 in form of an indented ring 24 as also the steering spindle 17.

FIGS. 1, 3 and 6. Substantially, the indented ring 24 has the same structure as the indented ring 2 and is described through the description of FIGS. 1 and 3. In contrast to the indented ring 2, the securing element 1 does not comprise the annular body 3 but the annular body 26 which, as shown in the figures, is directed towards the right and surrounds the retaining tongues 4 peripherally. As a result, the indented ring 24 comprises a flat front end surface 27 on which the wavy spring 23 is supported. The indented ring 24 is supported on the steering spindle 17 with help of the retaining tongues 4 against the force of the wavy spring 23. With help of the wavy spring, the clamping ring 22 is pressed and clamped between the inner ring 28 of the steering bearing 21 and the steering spindle 17. The inner ring 21 is supported in one direction through the clamping ring 22 on the steering spindle 17 and is otherwise without contact with the steering spindle 17 while being supported in the other direction on the outer ring 13 through the rolling elements 28 that are guided in the cage 14.

| | Reference numerals |
|---|---|
| 1 | Securing element |
| 1a | Recess |
| 2 | Indented ring |
| 3 | Annular body |
| 4 | Retaining tongues |
| 4a | End |
| 5 | Central axis |
| 6 | Hole |
| 7 | Front edge |
| 7a | Front edge |
| 8 | Surface |
| 8a | Surface section |
| 9 | Surface |
| 10 | Inner cylindrical surface |
| 11 | Depression |
| 12 | Inner ring |
| 12a | Annular body |
| 12b | Raceway section |
| 12d | Lengthening section |
| 12e | Retaining lugs |
| 13 | Outer ring |
| 14 | Cage |
| 15 | Steering bearing |
| 16 | Steering tube/Steering column tube |
| 17 | Steering spindle |
| 18 | Shaft seat |
| 19 | Surface of steering spindle |
| 20 | Steering column |
| 21 | Steering bearing |
| 22 | Clamping ring |
| 23 | Wavy spring |
| 24 | Indented ring |
| 25 | Steering column |
| 26 | Annular body |
| 27 | Flat surface |
| 28 | Rolling elements |
| 100 | Securing element |
| 101 | Indented ring |
| 102 | Annular body |
| 103 | Central axis |
| 104 | Retaining tongue |
| 105 | Front edge |
| 106 | Surface |
| 107 | Surface/front end Surface |
| 108 | End |

What is claimed is:

1. A securing element comprising:
an annular body; and
retaining tongues starting from the annular body and ending at a hole in the securing element, the hole being centered relative to a central axis of the securing element and extending axially through the securing element in a same direction as the central axis while being defined at narrowest radial hole cross-sections of the hole at least through front edges configured on end sides of the retaining tongues and wherein in each case at least first and second surfaces defining a part of the retaining tongue converge into each other at the respective front edge and end on the respective front edge, the first surface of the surfaces being configured on a front end side of the retaining tongue, the first and second surfaces inclined towards each other with at least an acute angle at least on one of the retaining tongues at least at a location where the first and second surfaces merge into the front edge, wherein the front edge is interrupted.

2. The securing element as recited in claim 1 wherein the front edge protrudes beyond a level of at least one of the first and second surfaces.

3. The securing element as recited in claim 1 wherein the front edge is interrupted by a radius of 0.2 to 0.4 mm.

4. The securing element as recited in claim 2 wherein the front edge protrudes beyond the front end surface into the hole, the retaining tongues extending out of at least one radial plane crossed perpendicularly by the central axis, and the retaining tongues extend at a slant to the radial plane.

5. The securing element as recited in claim 1 wherein the front edge is interrupted by a depression extending partially into at least one of the first and second surfaces.

6. The securing element as recited in claim 1 wherein the hole is further defined by an inner edge comprising recesses and adjoining the front edges, and the retaining tongues are separated from one another in a peripheral direction with help of the recesses starting from the annular body and being open towards the hole.

7. A steering bearing comprising:
at least an inner ring;
an outer ring;
rolling elements arranged between the inner ring and the outer ring; and
the securing element as recited in claim 1.

8. The steering bearing as recited in claim 7 wherein the securing element is configured in one piece with the inner ring.

9. A steering column comprising:
- at least one steering tube;
- at least one steering bearing as recited in claim 7; and
- a steering spindle mounted rotatably in the steering tube with help of the steering bearing, the inner ring being fixed on the steering spindle through positive engagement and force-locking at least with help of the front edge of the securing element.

10. A steering column comprising:
- at least one steering tube;
- at least one steering bearing comprising at least an inner ring, an outer ring, rolling elements arranged between the inner ring and the outer ring, and a securing element; and
- a steering spindle mounted rotatably in the steering tube with help of the steering bearing, the inner ring being fixed on the steering spindle through positive engagement and force-locking at least with help of the front edge of the securing element;
- the securing element including an annular body and retaining tongues starting from the annular body and ending at a hole in the securing element, the hole being centered relative to a central axis of the securing element and extending axially through the securing element in a same direction as the central axis while being defined at narrowest radial hole cross-sections of the hole at least through front edges configured on end sides of the retaining tongues and wherein in each case at least first and second surfaces defining a part of the retaining tongue converge into each other at the respective front edge and end on the respective front edge, the first surface of the surfaces being configured on a front end side of the retaining tongue, the first and second surfaces inclined towards each other with at least an acute angle at least on one of the retaining tongues at least at a location where the first and second surfaces merge into the front edge.

* * * * *